United States Patent
Zhang et al.

(10) Patent No.: US 10,280,750 B2
(45) Date of Patent: May 7, 2019

(54) FULL-ROADWAY FULL-PROCESS FULL-CROSS-SECTION SURFACE DEFORMATION MONITORING DEVICE AND METHOD

(71) Applicant: CHINA UNIVERSITY OF MINING AND TECHNOLOGY, Xuzhou (CN)

(72) Inventors: Nong Zhang, Xuzhou (CN); Zhengzheng Xie, Xuzhou (CN); Changliang Han, Xuzhou (CN); Dongjiang Pan, Xuzhou (CN)

(73) Assignee: CHINA UNIVERSITY OF MINING AND TECHNOLOGY, Xuzhou, Jiangsu (CN)

( * ) Notice: Subject to any disclaimer, the term of this patent is extended or adjusted under 35 U.S.C. 154(b) by 0 days.

(21) Appl. No.: 15/744,061

(22) PCT Filed: Jun. 7, 2017

(86) PCT No.: PCT/CN2017/087491
§ 371 (c)(1),
(2) Date: Jan. 12, 2018

(87) PCT Pub. No.: WO2018/082307
PCT Pub. Date: May 11, 2018

(65) Prior Publication Data
US 2018/0371907 A1    Dec. 27, 2018

(51) Int. Cl.
*E21F 17/18* (2006.01)
*G01B 11/30* (2006.01)
(Continued)

(52) U.S. Cl.
CPC .......... *E21F 17/185* (2013.01); *E21D 20/003* (2013.01); *E21D 20/02* (2013.01);
(Continued)

(58) Field of Classification Search
CPC ....... E21F 17/185; E21D 20/02; G01B 11/303
(Continued)

(56) References Cited

FOREIGN PATENT DOCUMENTS

| CN | 101812983 | 5/2010 |
|---|---|---|
| CN | 103697858 | 12/2013 |

(Continued)

*Primary Examiner* — Tri T Ton
(74) *Attorney, Agent, or Firm* — Soroker Agmon Nordman PTE Ltd

(57) ABSTRACT

The present invention provides a full-roadway full-process full-cross-section deformation monitoring device and a monitoring method thereof, which are applicable to the field of roadway surface deformation monitoring. A monitoring station is deployed utilizing an anchor rope, a supporting frame and a rotary laser measuring device are connected via a threaded sleeve at the tail end of the anchor rope, the rotary laser measuring device can rotate and drive a laser range finder to rotate, the data of a plurality of cross sections can be measured at the same time with one monitoring station, the data is processed by computer programming, so that the measurement data is converted into coordinates in a three-dimensional coordinate system, and thereby full-roadway full-process full-cross-section digital imaging is realized. The monitoring method attains high measuring accuracy, involves very low artificial error, supports intuitive observation of dynamic roadway deformation condition, can provide accurate warning for roof pressure condition, and provides a technical guarantee for safety of the downhole workers.

8 Claims, 2 Drawing Sheets

(51) Int. Cl.
  *E21D 20/02* (2006.01)
  *E21D 20/00* (2006.01)
  *E21F 17/00* (2006.01)
  *E21F 17/02* (2006.01)
(52) U.S. Cl.
  CPC .............. *E21F 17/00* (2013.01); *E21F 17/02* (2013.01); *G01B 11/303* (2013.01)
(58) Field of Classification Search
  USPC ................................................ 356/600–640
  See application file for complete search history.

(56) References Cited

FOREIGN PATENT DOCUMENTS

| | | |
|---|---|---|
| CN | 203891910 | 6/2014 |
| CN | 105783759 | 4/2016 |
| CN | 106401651 | 11/2016 |
| JP | 2011203090 | 10/2011 |

FULL-ROADWAY FULL-PROCESS FULL-CROSS-SECTION SURFACE DEFORMATION MONITORING DEVICE AND METHOD

FIELD OF THE INVENTION

The present invention relates to the field of roadway surface deformation monitoring, particularly to a fall-roadway full-process fall-cross-section surface deformation monitoring device and a method thereof.

BACKGROUND OF THE INVENTION

China is a country with the highest coal mining in the world. In order to exploit coal resources, a large number of roadways have to be excavated underground. Therefore, roadway maintenance and monitoring is especially important. During roadway tunneling, the surrounding rocks are subject to certain deformation and damage under the action of stress; however, the roadway deformation and damage is more severe during storing. If the roadway surface deformation is not monitored and controlled, crushed stones may fall from the roof sometimes or even the entire roof rock may fall, severely threatening the life safety of the underground workers.

The conventional roadway deformation monitoring method mainly involves manual measurement at specific spots. Such a method not only has high measurement errors and requires arrangement of a large number of cross sections, but also have too few of measurement spots for cross section monitoring to monitor the deformation condition at the cross sections accurately, not to mention reflecting the rule of deformation and damage of the surrounding rocks at the roadways.

SUMMARY OF THE INVENTION

Technical Problem

In view of the above-mentioned drawbacks in the prior art, the present invention provides a full-roadway full-process full-cross-section surface deformation monitoring device and a method thereof that are simple in structure, convenient to use, and can attain a good detection effect.

Technical Solution

In order to attain the above-mentioned technical object, the full-roadway full-process full-cross-section surface deformation monitoring device provided in the present invention comprises a connecting sleeve arranged on an externally threaded sleeve at the tail end of an anchor rope at a measurement spot in a roadway, a short anchor rod arranged vertically below the connecting sleeve, a drive hammer connected to one side of the connecting sleeve via a thin wire, a supporting frame fixed to the tail part of the anchor rod via upper and lower supporting frame fixing nuts, and a rotary laser measuring device arranged on the supporting frame.

The connecting sleeve consists of two sections arranged up-and-down: a large-diameter sleeve section and a small-diameter sleeve section; an anchor rope hole that matches the externally threaded sleeve at the tail end of the anchor rope is arranged in the large-diameter sleeve section from top to bottom, an anchor rod hole connected with the short anchor rod is arranged in the small-diameter sleeve section from bottom to top, a cylindrical thin rod a and a cylindrical thin rod b are arranged on the side surfaces of the large-diameter sleeve section respectively, the cylindrical thin rod a and the cylindrical thin rod b are identical in structure and are arranged linearly in the vertical direction, the cylindrical thin rod a and the cylindrical thin rod b are connected with the drive hammer via the thin wire.

The connecting sleeve is in length of 200 to 300 mm, the large-diameter sleeve section is in length of 150 mm to 200 mm, the length of the anchor rope hole in the large-diameter sleeve section is shorter than the length of the large-diameter sleeve section by 20 mm to 30 mm, and the anchor rope hole is fitted with the externally threaded sleeve via threads; the length of the small-diameter sleeve section is 50 mm to 100 mm, the length of the anchor rod hole is the same as the length of the small-diameter sleeve section, and the anchor rod hole is fitted with the short anchor rod via threads; the cylindrical thin rod a and the cylindrical thin rod b are in length of 10 mm to 30 mm and in diameter of 10 mm, the cylindrical thin rod b is at 20 mm to 30 mm from a lower platform of the large-diameter sleeve section, and the spacing between the cylindrical thin rod a and the cylindrical thin rod b is 70 mm to 90 mm.

The short anchor rod (9) is a full-thread anchor rod in length of 1.2 m to 1.5 m.

An anchor rod hole for mounting the short anchor rod and a supporting post hole for mounting the rotary laser measuring device are arranged at symmetric positions on two sides of the supporting frame respectively, a drive hammer embedding groove is arranged in the top surface of the supporting frame between the anchor rod hole and the supporting post hole.

The rotary laser measuring device comprises a rotary supporting post, a unidirectional rotation handle a is arranged on the rotary supporting post, a clamp nut is provided at the bottom of the rotary supporting post, the rotary supporting post between the handle a and the clamp nut is arranged in the supporting post hole of the supporting frame and is fixed by the clamp nut and a pin on the clamp nut, a base is arranged on the top of the rotary supporting post, a rotating shaft is arranged in the base, a laser range finder is arranged on one end of the rotating shaft, and a unidirectional rotation handle b is arranged on the other end of the rotating shaft.

A cutting tooth gear is arranged above the supporting post hole of the supporting frame coaxially, the cutting tooth gear comprises a scale dial a and a plurality of cutting teeth a, the cutting teeth a of the cutting tooth gear are of a right angle type, and the angle between the lowest points of two adjacent cutting teeth a is 10° to 15°; a coaxial cutting tooth gear oriented to the handle b is arranged on the end of the base where the handle b is mounted, the cutting tooth gear comprises a scale dial b and right angle type cutting teeth b arranged on the scale b, and the angle between two lowest points of two adjacent cutting teeth is 5° to 10°.

A frill-roadway full-process full-cross-section surface deformation monitoring method, comprising the following steps:

a. selecting a relatively flat cross section near the start point of a roadway, and deploying a first monitoring station there;

b. drilling a hole in the middle part of the roof at the cross section where the first monitoring station locates with a jumbolter in a way that the hole penetrates the immediate roadway roof to the main roof, loading an anchoring agent into the hole, pushing the anchoring agent to the bottom of the hole with an anchor rope, fitting a tray over an externally threaded sleeve at the tail end of the anchor rope and fixing the tray with a nut, starting the jumbolter to drive the anchor rope to stir the anchoring agent, and pre-tightening up the nut with the jumbolter after the anchoring agent is cured;

c. screwing the large-diameter section of a connecting sleeve into the externally threaded sleeve at the tail end of the anchor rope and tightening up, screwing a short anchor rod into the small-diameter section of the connecting sleeve and tightening up, fixing a drive hammer to a cylindrical thin rod b with a thin wire, screwing the anchor rod hole of a supporting frame into the bottom end of the short anchor rod so that the drive hammer is right clamped in the drive hammer embedding groove of the supporting frame, fixing the supporting frame with fixing nuts, inserting the rotary supporting post of a rotary laser measuring device into the supporting post hole of the supporting frame, tightening up the nut and then inserting the pin to secure the rotary laser measuring device;

d. turning the handle a of the rotary laser measuring device to position 0° indicated on the scale dial a, and then turning the handle b connected to the laser range finder to position 0° indicated on the scale dial b; now, the installation of the first monitoring station is completed; starting to establish a three-dimensional coordinate system: taking the center position of the laser range finder as the origin of the three-dimensional coordinate system, the direction oriented to the coal pillars perpendicularly from the origin as X-axis, the direction oriented to the roof perpendicularly from the origin as Y-axis, and the direction oriented to the tunneling face perpendicularly from the origin as Z-axis;

e. turning the handle b connected to the laser range finder while keeping the handle a of the rotary laser measuring device stationary, measuring once with the laser range finder whenever the handle b is turned by a cutting tooth b (21), till the measurement at the entire cross section is completed; recording the measured distance and angle data in each measurement;

f. turning the handle a of the rotary laser measuring device and stopping at a predetermined angle within 10° to 20°, 25° to 35°, 40° to 50°, 55° to 65°, 70° to 80°, 100° to 110°, 115° to 125°, 130° to 140°, 145° to 155°, and 160° to 170° ranges respectively, and repeating the step e to acquire data;

g. taking the distance from the farthest point of cross section to the center position of the laser range finder on the Z-axis measured at a predetermined angle γ within 55° to 65° range as S/2, wherein, the height of the roadway is H, the width of the roadway is L the distance measured by the laser range finder is $l_γ$, $S^2=4l_γ^2-H^2-L^2$ as calculated on the basis of the geometrical relationship among the sides of a triangle, and thus the distance S between the stations at the two sides is obtained; next, deploying a next monitoring station, and then repeating the steps a to f, till all monitoring stations are deployed in the roadway to be observed and the monitoring data at all monitoring stations is acquired;

h. converting the data points acquired in the downhole environment into coordinate points in the three-dimensional coordinate system with a computer, screening out space points of which the Z-axis coordinates are the same or have errors equal to or smaller than 5 mm from each other as imaging points on a cross section of the roadway, determining a profile image of the cross section from the screened imaging points of the cross section, processing the space coordinate points at all monitoring stations to obtain an overall profile image of the roadway; thus, the roadway deformation monitoring is completed;

f. in the next time of roadway deformation monitoring, repeating the steps c to f at each monitoring station by measuring at the same angles in the ranges with the rotary laser measuring device in the step f, and repeating the step h to process the data and obtain the profile images of the cross sections in the monitoring, superposing the profile images of the cross sections acquired in the current monitoring on the corresponding profile images of the cross sections acquired in the previous monitoring, so as to obtain information on the surrounding rock deformation condition of the roadway;

the measuring periods are: once per day in the first 3 days, once per two days from day 4 to day 11, and once per 7 days from day 12 to day 33. The length of the anchor rope (4) is greater than the depth of the hole by 200 mm to 300 mm one externally threaded sleeve (5) is arranged at the tail end of the anchor rope (4), the length of the sleeve is greater than the exposed length of the anchor rope by 50 mm to 100 mm, and the diameter of the sleeve is greater than the diameter of the anchor rope by 4 mm to 6 mm; the length of the hole is 8 m to 10 m and the diameter of the hole is greater than the diameter of the anchor rope (4) by 4 mm to 6 mm.

Beneficial effects: With the above-mentioned technical solution, the method provided in the present invention has the following advantages when compared with the prior art (1) Generally, within 30 days after roadway excavation, the deep surrounding rocks essentially have no deformation, or the deformation is within an allowable error range if the deep surrounding rocks have deformation; besides, an anchor rope in 8 to 10 m length can penetrate into the deep main roof; thus, that position can be determined as a zero displacement point; in addition, the monitoring station is positioned with a drive hammer, and thereby the accurate position of the monitoring station can be found accurately in the subsequent measurement, and the absolute deformation amount of the roadway can be measured, to provide a guide for roadway supporting;

(2) The monitoring station is arranged at the tail end of the anchor rope, the device can be mounted before the measurement and removed after the measurement; hence, the operation is convenient and doesn't hinder the construction, and the anchor rope provides a supporting effect for the roof;

(3) The deformation of the surrounding rocks is monitored with a laser range finder, and thereby any high artificial error can be avoided;

(4) In the measurement process, the cross sections of a roadway can be measured at multiple points by the laser range finder, the orientation of the laser range finder can be changed by means of a rotating disk, and thereby the deformation of a plurality of cross sections can be measured; thus, the deformation of a plurality of cross sections can be monitored with a single monitoring station, the quantity of the monitoring stations is reduced, and the monitoring time is shortened;

(5) The distance and angle values of the measuring points measured by the laser range finder can be converted by computer programming into three-dimensional coordinate points, space points that have the same Z coordinate or have an error of Z coordinate equal to or smaller than 5 mm can be extracted from the three-dimensional coordinate points, and images of measured cross sections can be plotted; in addition, the image of cross section obtained in the next measurement can be converged with the image of cross section obtained in the present measurement, so that the dynamic roadway deformation can be observed intuitively and warning for roof pressure condition can be provided accurately, to provide a technical guarantee for downhole workers.

DESCRIPTION OF PREFERRED EMBODIMENTS

Hereunder the present invention will be further detailed in an embodiment with reference to the accompanying drawings.

Figure 1:
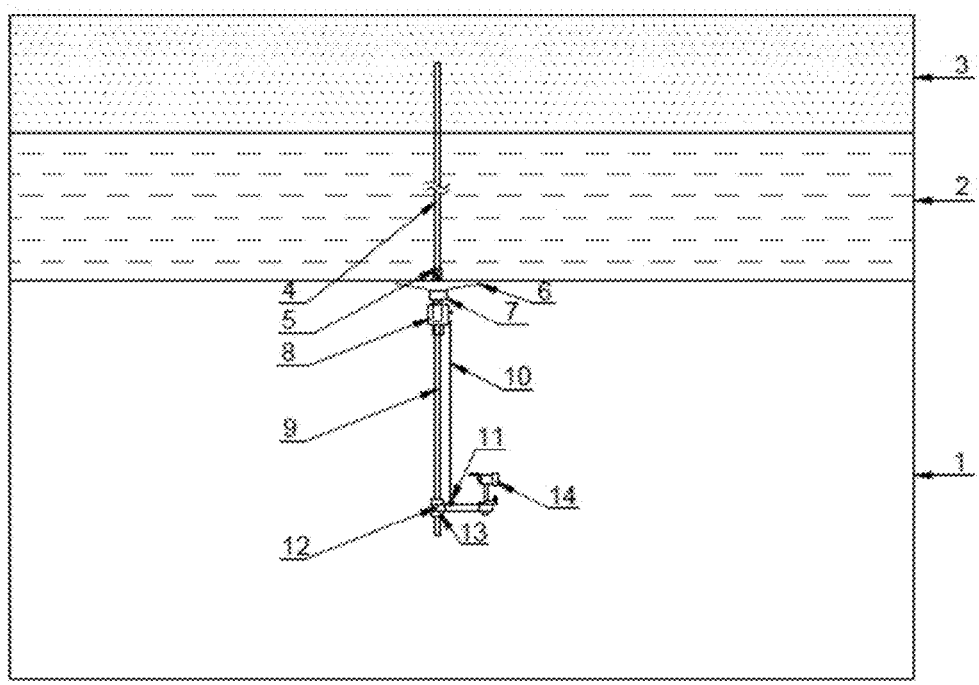
FIG. 1 is a schematic working diagram of the full-roadway full-process full-cross-section surface deformation monitoring in the present invention.

As shown in FIG. 1, the full-roadway full-process full-cross-section surface deformation monitoring device provided in the present invention comprises: a connecting sleeve 8 arranged on an externally threaded sleeve 5 at the tail end of an anchor rope 4 at a measurement spot in a roadway 1, a short anchor rod 9 arranged vertically below the connecting sleeve 8, a drive hammer 11 connected to one side of the connecting sleeve 8 via a thin wire 10, a supporting frame 12 fixed to the tail part of the anchor rod 9 via upper and lower supporting frame fixing nuts 13, and a rotary laser measuring device 14 arranged on the supporting frame 12.

Figure 2:
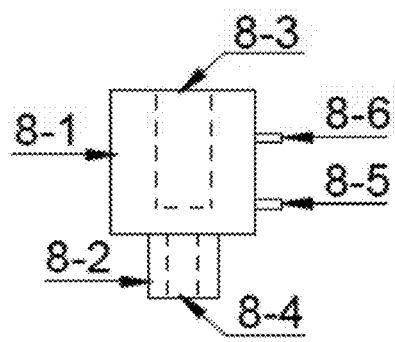
FIG. 2 is a schematic structural diagram of the connecting sleeve in the present invention.

As shown in FIG. 2, the connecting sleeve 6 consists of two sections arranged up-and-down: a large-diameter sleeve section 8-1 and a small-diameter sleeve section 8-2; an anchor rope hole 8-3 that matches the externally threaded sleeve 5 at the tail end of the anchor rope 4 is arranged in the large-diameter sleeve section 8-1 from top to bottom, an anchor rod hole 6-4 connected with the short anchor rod 9 is arranged in the small-diameter sleeve section 8-2 from bottom to top, a cylindrical thin rod a 8-5 and a cylindrical thin rod b 8-6 are arranged on the side surfaces of the large-diameter sleeve section 8-1 respectively, the cylindrical thin rod a 8-5 and the cylindrical thin rod b 8-6 are identical in structure and are arranged linearly in the vertical direction, the cylindrical thin rod a 8-5 and the cylindrical thin rod b 8-6 are connected with the drive hammer 11 via the thin wire 10.

The connecting sleeve 8 is in length of 200 to 300 mm, the large-diameter sleeve section 8-1 is in length of 150 mm to 200 mm, the length of the anchor rope hole 8-3 in the large-diameter sleeve section 8-1 is shorter than the length of the large-diameter sleeve section 8-1 by 20 mm to 30 mm, and the anchor rope hole 8-3 is fitted with the externally threaded sleeve 5 via threads; the length of the small-diameter sleeve section 8-2 is 50 mm to 100 mm, the length of the anchor rod hole 8-4 is the same as the length of the small-diameter sleeve section 8-2, and the anchor rod hole 8-4 is fitted with the short anchor rod 9 via threads; the cylindrical thin rod a 8-5 and the cylindrical thin rod b 8-6 are in length of 10 mm to 30 mm and in diameter of 10 mm, the cylindrical thin rod b is at 20 mm to 30 mm from a lower platform of the large-diameter sleeve section, and the spacing between the cylindrical thin rod a 8-5 and the cylindrical thin rod b 8-6 is 70 mm to 90 mm. The short anchor rod 9 is a full-thread anchor rod in length of 1.2 m to 1.5 m.

Figure 3:
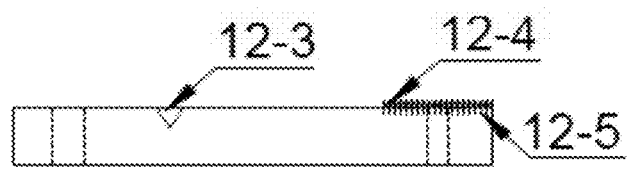
FIG. 3 is a front view of the supporting frame in the present invention.
Figure 4:
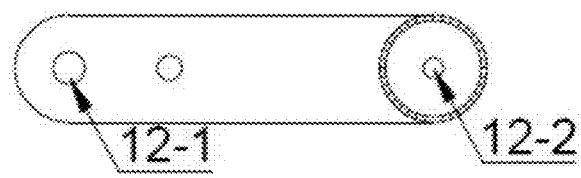
FIG. 4 is a top view of the supporting frame in the present invention.

As shown in FIGS. 3 and 4, an anchor rod hole 12-1 for mounting the short anchor rod 9 and a supporting post hole 12-2 for mounting the rotary laser measuring device 14 are arranged at Symmetric positions on two sides of the supporting frame 12 respectively, a drive hammer embedding groove 12-3 is arranged in the top surface of the supporting frame 12 between the anchor rod hole 12-1 and the supporting post hole 12-2.

Figure 5:
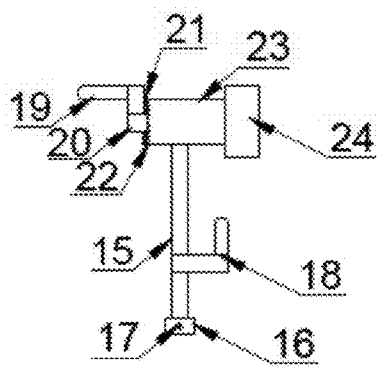
FIG. 5 is a schematic structural diagram of the rotary laser measuring device in the present invention.

As shown in FIG. 5, the rotary laser measuring device 14 comprises a rotary supporting post 15, a unidirectional rotation handle a 18 is arranged on the rotary supporting post 15, a clamp nut 16 is provided at the bottom of the rotary supporting post 15, the rotary supporting post 15 between the handle a 18 and the clamp nut 16 is arranged in the supporting post hole 12-2 of the supporting frame 12 and is fixed by the clamp nut 16 and a pin 17 on the clamp nut, a base 23 is arranged on the top of the rotary supporting post 15, a rotating shaft 20 is arranged in the base 23, a laser range finder 24 is arranged on one end of the rotating shaft 20, and a unidirectional rotation handle b19 is arranged on the other end of the rotating shaft 20.

A cutting tooth gear is arranged above the supporting post hole 12-2 of the supporting frame 12 coaxially, the cutting tooth gear comprises a scale dial a12-5 and a plurality of cutting teeth a 12-4, the cutting teeth a12-4 of the cutting tooth gear are of a right angle type, and the angle between the lowest points of two adjacent cutting teeth a12-4 is 10° to 15°; a coaxial cutting tooth gear oriented to the handle b19 is arranged on the end of the base 15 where the handle b19 is mounted, the cutting tooth gear comprises a scale dial b22 and right angle type cutting teeth b21 arranged on the scale dial b22, and the angle between two lowest points of two adjacent cutting teeth is 5° to 10°.

Figure 6:
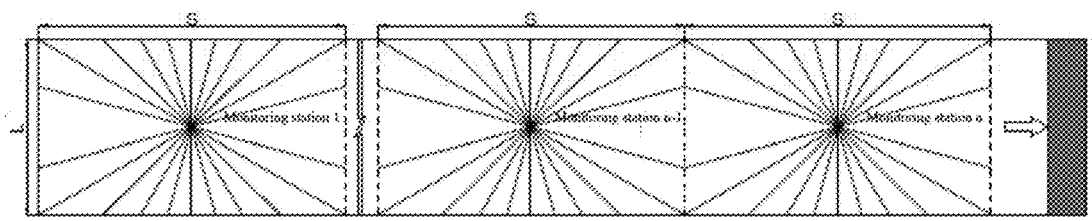
FIG. 6 is a top view of the layout of a roadway rock pressure monitoring station in the present invention.
Figure 7:
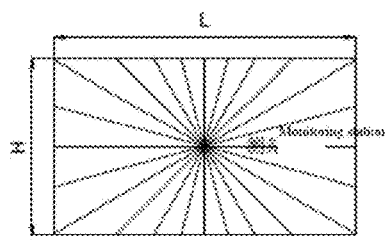
FIG. 7 is a left view of the layout of a roadway rock pressure monitoring station in the present invention.

As shown in FIGS. 6 to 7, the present invention further provides a full-roadway full-process full-cross-section surface deformation monitoring method, which comprises the following steps:

a. selecting a relatively flat cross section near the start point of a roadway 1, and deploying a first monitoring station there;
b. drilling a hole in the middle part of the roof at the cross section where the first monitoring station locates with a jumbolter in a way that the hole penetrates the immediate roof 2 of the roadway 1 to the main roof 3, loading an anchoring agent into the hole, pushing the anchoring agent to the bottom of the hole with an anchor rope 4, fitting a tray 6 over an externally threaded sleeve 5 at the tail end of the anchor rope 4 and fixing the tray 6 with a nut 7, starting the jumbolter to drive the anchor rope 4 to stir the anchoring agent, and pre-tightening up the nut 7 with the jumbolter after the anchoring agent is cured;
c. screwing the large-diameter section 8-1 of a connecting sleeve 8 into the externally threaded sleeve 5 at the tail end of the anchor rope 4 and tightening up, screwing a short anchor rod 9 into the small-diameter section 8-2 of the connecting sleeve 8 and tightening up, fixing a drive hammer 11, to a cylindrical thin rod b8-6 with a thin wire 10, screwing the anchor rod hole 12-1 of a supporting frame 12 into the bottom end of the short anchor rod 9 so that the drive hammer 11 is right clamped in the drive hammer embedding groove 12-3 of the supporting frame 12, fixing the supporting frame 12 with fixing nuts 13, inserting the rotary supporting post 15 of a rotary laser measuring device 14 into the supporting post hole 12-2 of the supporting frame 12, tightening up the nut 16 and then inserting the pin 17 to secure the rotary laser measuring device;
d. turning the handle a18 of the rotary laser measuring device to position 0° indicated on the scale dial a12-5, and then turning the handle b19 connected to the laser range finder 24 to position 0° indicated on the scale dial b22; now, the installation of the first monitoring station is completed; starting to establish a three-dimensional coordinate system: taking the center position of the laser range finder 24 as the origin of the three-dimensional coordinate system, the direction oriented to the coal pillars perpendicularly from the origin as X-axis, the direction oriented to the roof perpendicularly from the origin as Y-axis, and the direction oriented to the tunneling face perpendicularly from the origin as Z-axis;
e. turning the handle b connected to the laser range finder while keeping the handle a18 of the rotary laser measuring device stationary, measuring once with the laser range finder 24 whenever the handle b19 is turned by a cutting tooth b(21), till the measurement at the entire cross section is completed; recording the measured distance and angle data in each measurement;
f. turning the handle a18 of the rotary laser measuring device and stopping at a predetermined angle within 10° to 20°, 25° to 35°, 40° to 50°, 55° to 65°, 70° to 80°, 100° to 110°, 115° to 125°, 130° to 140°, 145° to 155°, and 160° to 170° ranges respectively, and repeating the step e to acquire data;
g. taking the distance from the farthest point of cross section to the center position of the laser range finder 24 on the Z-axis measured at a predetermined angle $\gamma$ within 55° to 65° range as S/2, wherein, the height of the roadway is H, the width of the roadway is L, the distance measured by the laser range finder is $l_\gamma$, $S^2 = 4l_\gamma^2 - H^2 - L^2$ as calculated on the basis of the geometrical relationship among the sides of a triangle, and thus the distance S between the stations at the two sides is obtained; next, deploying a next monitoring station, and then repeating the steps a to f, till all monitoring stations are deployed in the roadway to be observed and the monitoring data at all monitoring stations is acquired;
h. converting the data points acquired in the downhole environment into coordinate points in the three-dimensional coordinate system with a computer, screening out space points of which the Z-axis coordinates are the same or have errors equal to or smaller than 5 mm from each other as imaging points on a cross section of the roadway, determining a profile image of the cross section from the screened imaging points of the cross section, processing the space coordinate points at all monitoring stations to obtain an overall profile image of the roadway; thus, the roadway deformation monitoring is completed;
i. in the next time of roadway deformation monitoring, repeating the steps c to f at each monitoring station by measuring at the same angles in the ranges with the rotary laser measuring device in the step f and repeating the step h to process the data and obtain the profile images of the cross sections in the monitoring, superposing the profile images of the cross sections acquired in the current monitoring on the corresponding profile images of the cross sections acquired in the previous monitoring, so as to obtain information on the surrounding rock deformation condition of the roadway;

the length of the anchor rope 4 is greater than the depth of the hole by 200 mm to 300 mm, one externally threaded sleeve 5 is arranged at the tail end of the anchor rope 4, the length of the sleeve is greater than the exposed length of the anchor rope by 50 mm to 100 mm, and the diameter of the sleeve is greater than the diameter of the anchor rope by 4 mm to 6 mm; the length of the hole is 8 m to 10 m, and the diameter of the hole is greater than the diameter of the anchor rope 4 by 4 mm to 6 mm, the measuring periods are: once per day in the first 3 days, once per two days from day 4 to day 11, and once per 7 days from day 12 to day 33.

Figure 8:
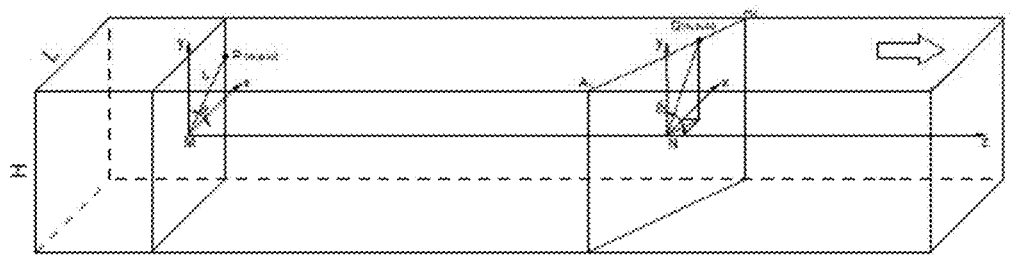
FIG. 8 is schematic diagram of roadway rock pressure data processing in the present invention. In the figures; 1—roadway; 2—immediate roof; 3—main roof; 4—long anchor rope; 5—threaded sleeve; 6—tray; 7—anchor rope pre-tightening nut; 8—connecting sleeve; 8-1—large-diameter sleeve section; 8-2—small-diameter sleeve section; 8-3—anchor rope hole; 8-4—anchor rod hole; 8-5—cylindrical thin rod a; 8-6—cylindrical thin rod b; 9—short anchor rod; 10—thin wire; 11—drive hammer; 12—supporting frame; 12-1—anchor rod hole; 12-2—supporting post hole; 12-3—drive hammer embedding groove; 12-4—cutting tooth a; 12-5—scale dial a; 13—supporting frame fixing nut; 14—rotary laser measuring device; 15—rotary supporting post; 16—supporting post clamp nut; 17—pin; 18—handle a; 19—handle b; 20—rotating shaft; 21—cutting tooth b; 22—scale dial b; 23—base; 24—laser range finder.

FIG. 8 is a schematic diagram of roadway rock pressure observation data processing in the present invention. The measurement data is converted into coordinates in a three-dimensional coordinate system through calculation and programming, and thereby profiles of cross sections of the roadway can be plotted. Hereunder the data processing process will be introduced in the following two examples:

Point m and point n represent monitoring station M and monitoring station N respectively. At the monitoring station M, the roadway cross section at angle $\alpha_p = 0°$ indicated on the scale dial a and angle $\beta_p$ indicated on the scale dial b is measured, the measuring point is M (0, 0, M·S); at a point P ($x_p$, $y_p$, $z_p$) on the cross section, the roadway width is L, the roadway height is H, the distance $l_p$, can be measured with the laser range finder, and the following result can be obtained directly from FIG. 9: $x_p = L/2$, $z_p = M·S$, $y_p = l_p \cdot \sin \beta_p$. At monitoring station M, the roadway cross section at angle $\alpha_q$ indicated on the scale dial a and angle $\beta_q$ indicated on the scale dial b is measured, at measuring point N (0, 0, N·S), suppose a point on the cross section is Q ($x_q$, $y_q$, $z_q$), with shoulder angle $A_1$ ($x_1$, $y_1$, $z_1$) and shoulder angle $A_2$ ($x_2$, $y_2$, $z_2$), the linear equation of point Q must be determined to obtain the three-dimensional coordinates of point Q; the linear equation can be obtained with shoulder angles $A_1$ and $A_2$, and the distances $l_q$, $l_{A1}$ and $l_{A2}$ can be measured with the laser range finder; based on geometry knowledge, the linear equation of $A_1$, $A_2$ can be determined, and then the three-dimensional coordinates of point Q can be obtained.

Then, the linear equation is programmed with software, to obtain the coordinates of all monitoring points on the cross section; space points that have the same Z-axis coordinate or have an error equal to or smaller than 5 mm are taken as points on a roadway cross section, and thereby the image of a roadway cross section can be determined; all of the space points are processed to turn them into an overall profile diagram of the roadway.

The invention claimed is:

1. A full-roadway full-process full-cross-section surface deformation monitoring device, comprising: a connecting sleeve arranged on an externally threaded sleeve at the tail end of an anchor rope at a measurement spot in a roadway, a short anchor rod arranged vertically below the connecting sleeve, a drive hammer connected to one side of the connecting sleeve via a thin wire, a supporting frame fixed to the tail part of the anchor rod via upper and lower supporting frame fixing nuts, and a rotary laser measuring device arranged on the supporting frame; the connecting sleeve consists of two sections arranged up-and-down: a large-diameter sleeve section and a small-diameter sleeve section; an anchor rope hole that matches the externally threaded sleeve at the tail end of the anchor rope is arranged in the large-diameter sleeve section from top to bottom, an anchor rod hole connected with the short anchor rod is arranged in the small-diameter sleeve section from bottom to top, a cylindrical thin rod a and a cylindrical thin rod b are arranged on the side surfaces of the large-diameter sleeve section respectively, the cylindrical thin rod a and the cylindrical thin rod b are identical in structure and are arranged linearly in the vertical direction, the cylindrical thin rod a and the cylindrical thin rod b are connected with the drive hammer via the thin wire; the short anchor rod is a full-thread anchor rod in length of 1.2 m to 1.5 m.

2. The full-roadway full-process full-cross-section surface deformation monitoring device according to claim 1, wherein, the connecting sleeve is in length of 200 to 300 mm, the large-diameter sleeve section is in length of 150 mm to 200 mm, the length of the anchor rope hole in the large-diameter sleeve section is shorter than the length of the large-diameter sleeve section by 20 mm to 30 mm, and the anchor rope hole is fitted with the externally threaded sleeve via threads; the length of the small-diameter sleeve section is 50 mm to 100 mm, the length of the anchor rod hole is the same as the length of the small-diameter sleeve section, and the anchor rod hole is fitted with the short anchor rod via threads; the cylindrical thin rod a and the cylindrical thin rod b are in length of 10 mm to 30 mm and in diameter of 10 mm, the cylindrical thin rod b is at 20 mm to 30 mm from a lower platform of the large-diameter sleeve section, and the spacing between the cylindrical thin rod a and the cylindrical thin rod b is 70 mm to 90 mm.

3. The full-roadway full-process full-cross-section surface deformation monitoring device according to claim 1, wherein, an anchor rod hole for mounting the short anchor rod and a supporting post hole for mounting the rotary laser measuring device are arranged at symmetric positions on two sides of the supporting frame respectively, a drive hammer embedding groove is arranged in the top surface of the supporting frame between the anchor rod hole and the supporting post hole.

4. The full-roadway full-process full-cross-section surface deformation monitoring device according to claim 3, wherein, a cutting tooth gear is arranged above the supporting post hole of the supporting frame coaxially, the cutting tooth gear comprises a scale dial a and a plurality of cutting teeth a, the cutting teeth a of the cutting tooth gear are of a right angle type, and the angle between the lowest points of two adjacent cutting teeth a is 10° to 15°; a coaxial cutting tooth gear oriented to the handle b is arranged on the end of the base where the handle b is mounted, the cutting tooth gear comprises a scale dial b and right angle type cutting teeth b arranged on the scale dial b, and the angle between two lowest points of two adjacent cutting teeth is 5° to 10°.

5. The full-roadway full-process full-cross-section surface deformation monitoring device according to claim 3, wherein, a cutting tooth gear is arranged above the supporting post hole of the supporting frame coaxially, the cutting tooth gear comprises a scale dial a and a plurality of cutting teeth a, the cutting teeth a of the cutting tooth gear are of a right angle type, and the angle between the lowest points of two adjacent cutting teeth a is 10° to 15°; a coaxial cutting tooth gear oriented to the handle b is arranged on the end of the base where the handle b is mounted, the cutting tooth gear comprises a scale dial b and right angle type cutting teeth b arranged on the scale dial b, and the angle between two lowest points of two adjacent cutting teeth is 5° to 10°.

6. A full-roadway full-process full-cross-section surface deformation monitoring method, comprising:
  a. selecting a relatively flat cross section near the start point of a roadway, and deploying a first monitoring station there;
  b. drilling a hole in the middle part of the roof at the cross section where the first monitoring station locates with a jumbolter in a way that the hole penetrates the immediate roof of the roadway to the main roof, loading an anchoring agent into the hole, pushing the anchoring agent to the bottom of the hole with an anchor rope, fitting a tray over an externally threaded sleeve at the tail end of the anchor rope and fixing the tray with a nut, starting the jumbolter to drive the anchor rope to stir the anchoring agent, and pre-tightening up the nut with the jumbolter after the anchoring agent is cured;
  c. screwing the large-diameter section of a connecting sleeve into the externally threaded sleeve at the tail end of the anchor rope and tightening up, screwing a short anchor rod into the small-diameter section of the connecting sleeve and tightening up, fixing a drive hammer to a cylindrical thin rod b with a thin wire, screwing the anchor rod hole of a supporting frame into the bottom end of the short anchor rod so that the drive hammer is right clamped in the drive hammer embedding groove of the supporting frame, fixing the supporting frame with fixing nuts, inserting the rotary supporting post of a rotary laser measuring device into the supporting post hole of the supporting frame, tightening up the nut and then inserting the pin to secure the rotary laser measuring device;
  d. turning the handle a of the rotary laser measuring device to position 0° indicated on the scale dial a, and then turning the handle b connected to the laser range finder to position 0° indicated on the scale dial b; now, the installation of the first monitoring station is completed; starting to establish a three-dimensional coordinate system: taking the center position of the laser range finder as the origin of the three-dimensional coordinate system, the direction oriented to the coal pillars perpendicularly from the origin as X-axis, the direction oriented to the roof perpendicularly from the origin as Y-axis, and the direction oriented to the tunneling face perpendicularly from the origin as Z-axis;

e. turning the handle b connected to the laser range finder while keeping the handle a of the rotary laser measuring device stationary, measuring once with the laser range finder whenever the handle b is turned by a cutting tooth b, till the measurement at the entire cross section is completed; recording the measured distance and angle data in each measurement;

f. turning the handle a of the rotary laser measuring device and stopping at a predetermined angle within 10° to 20°, 25° to 35°, 40° to 50°, 55° to 65°, 70° to 80°, 100° to 110°, 115° to 125°, 130° to 140°, 145° to 155°, and 160° to 170° ranges respectively, and repeating the step e to acquire data;

g. taking the distance from the farthest point of cross section to the center position of the laser range finder on the Z-axis measured at a predetermined angle γ within 55° to 65° range as S/2, wherein, the height of the roadway is H, the width of the roadway is L, the distance measured by the laser range finder is lγ, S2=4lγ2−H2−L2 as calculated on the basis of the geometrical relationship among the sides of a triangle, and thus the distance S between the stations at the two sides is obtained; next, deploying a next monitoring station, and then repeating the steps a to f, till all monitoring stations are deployed in the roadway to be observed and the monitoring data at all monitoring stations is acquired;

h. converting the data points acquired in the downhole environment into coordinate points in the three-dimensional coordinate system with a computer, screening out space points of which the Z-axis coordinates are the same or have errors equal to or smaller than 5 mm from each other as imaging points on a cross section of the roadway, determining a profile image of the cross section from the screened imaging points of the cross section, processing the space coordinate points at all monitoring stations to obtain an overall profile image of the roadway; thus, the roadway deformation monitoring is completed;

i. in the next time of roadway deformation monitoring, repeating the steps c to f at each monitoring station by measuring at the same angles in the ranges with the rotary laser measuring device in the step f, and repeating the step h to process the data and obtain the profile images of the cross sections in the monitoring, superposing the profile images of the cross sections acquired in the current monitoring on the corresponding profile images of the cross sections acquired in the previous monitoring, so as to obtain information on the surrounding rock deformation condition of the roadway.

7. The full-roadway full-process full-cross-section surface deformation monitoring method according to claim 6, wherein, the measuring periods are: once per day in the first 3 days, once per two days from day 4 to day 11, and once per 7 days from day 12 to day 33.

8. The full-roadway full-process full-cross-section surface deformation monitoring method according to claim 6, wherein, the length of the anchor rope is greater than the depth of the hole by 200 mm to 300 mm, one externally threaded sleeve is arranged at the tail end of the anchor rope, the length of the sleeve is greater than the exposed length of the anchor rope by 50 mm to 100 mm, and the diameter of the sleeve is greater than the diameter of the anchor rope by 4 mm to 6 mm; the length of the hole is 8 m to 10 m, and the diameter of the hole is greater than the diameter of the anchor rope by 4 mm to 6 mm.

* * * * *